United States Patent [19]
Sullivan

[11] Patent Number: 5,992,276
[45] Date of Patent: Nov. 30, 1999

[54] SAFETY GUARD FOR LATHES

[76] Inventor: David R. Sullivan, 420 McKinley St., Suite 111-353, Corona, Calif. 91719

[21] Appl. No.: 09/058,085

[22] Filed: Apr. 9, 1998

[51] Int. Cl.$^6$ ........................................... B23B 5/00
[52] U.S. Cl. .................................. 82/112; 82/153; 82/173; 409/134
[58] Field of Search ............................. 82/112, 153, 173, 82/901; 74/608, 609, 612, 613, 614, 615; 409/134

[56] References Cited

U.S. PATENT DOCUMENTS

| | | | |
|---|---|---|---|
| 3,783,709 | 1/1974 | Scott | 74/612 |
| 4,514,936 | 5/1985 | Hurtado | 409/134 |
| 4,863,320 | 9/1989 | Riitschle | 74/614 |
| 5,342,156 | 8/1994 | Baba | 409/134 |

*Primary Examiner*—Andrea L. Pitts
*Assistant Examiner*—Henry W. H. Tsai
*Attorney, Agent, or Firm*—James E. Brunton

[57] ABSTRACT

A safety apparatus for use in connection with motor driven machine tools such as engine lathes of the character used to dress the brake shoe and brake pad engaging surface of automobile brake drums and rotors. The safety apparatus can be quickly and easily attached to conventional brake drum/disc dressing lathes without the necessity of substantially modifying the lathes, does not interfere with the normal machining processes and yet fully protects the operator from accidentally contacting the rotating work pieces during the dressing operation. The apparatus includes novel safety switch mechanisms which positively prevent energization of a motor of the lathe using the factory installed "on-off" switch of the machine so long as the safety guard is in a raised position. Accordingly, required work piece set-up operations can be accomplished only through use of a specially wired foot switch which permits controlled, intermittent energization of the lathe motor by the operator.

6 Claims, 7 Drawing Sheets

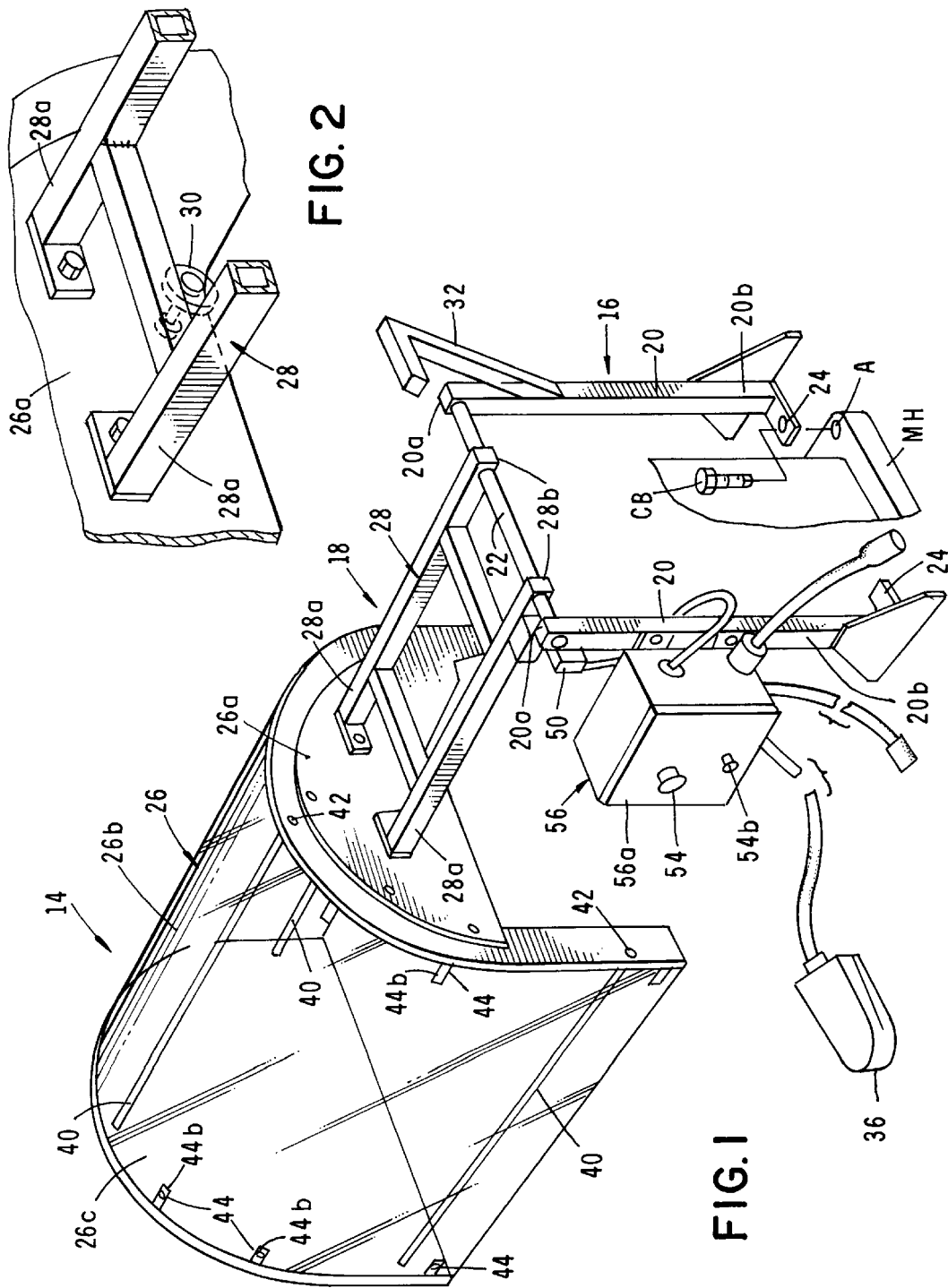

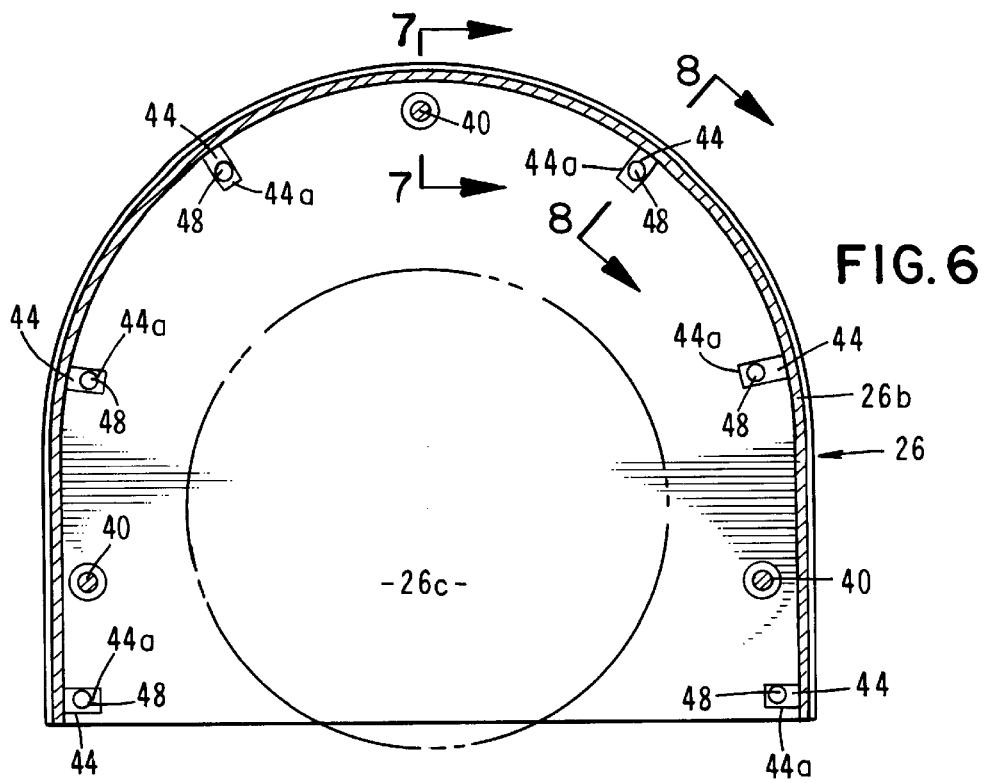
FIG. 6
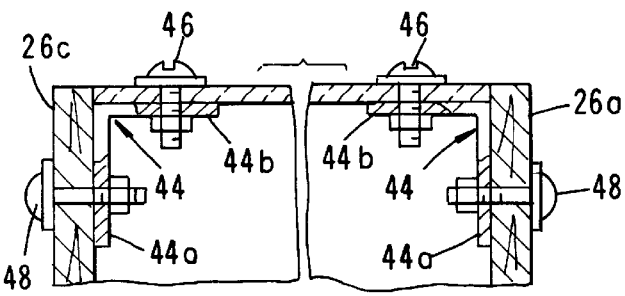
FIG. 7
FIG. 8
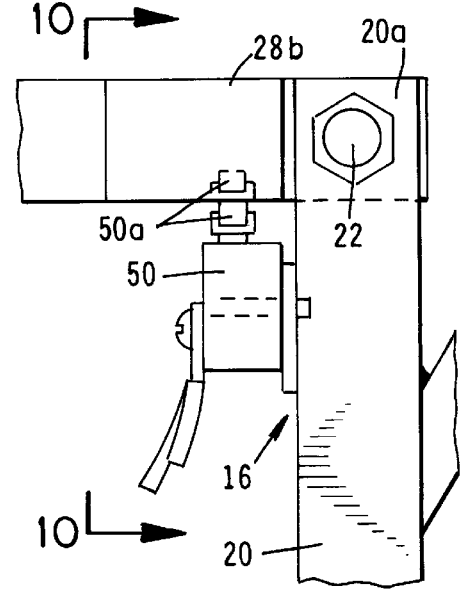
FIG. 9

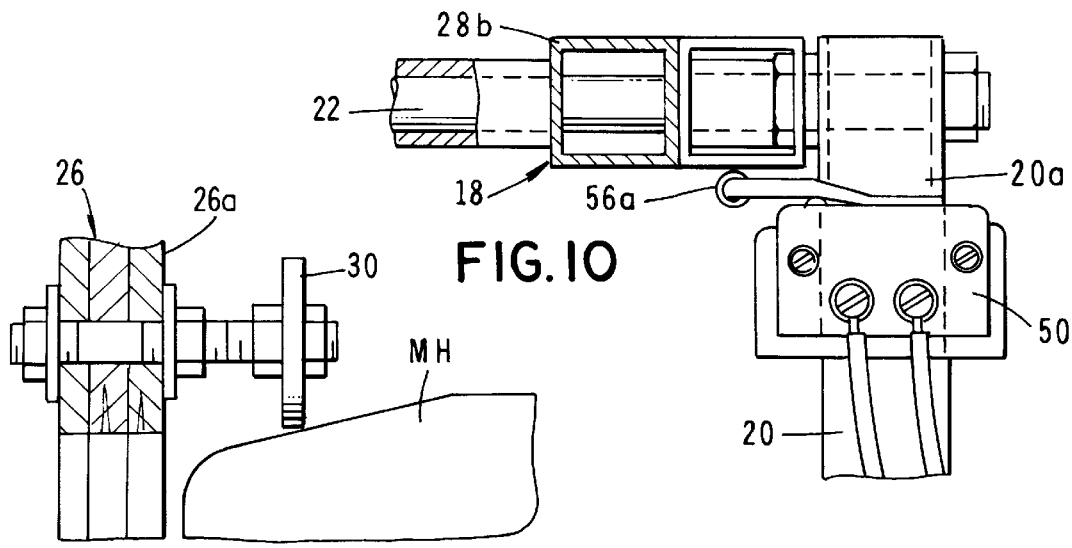
FIG.10
FIG.12
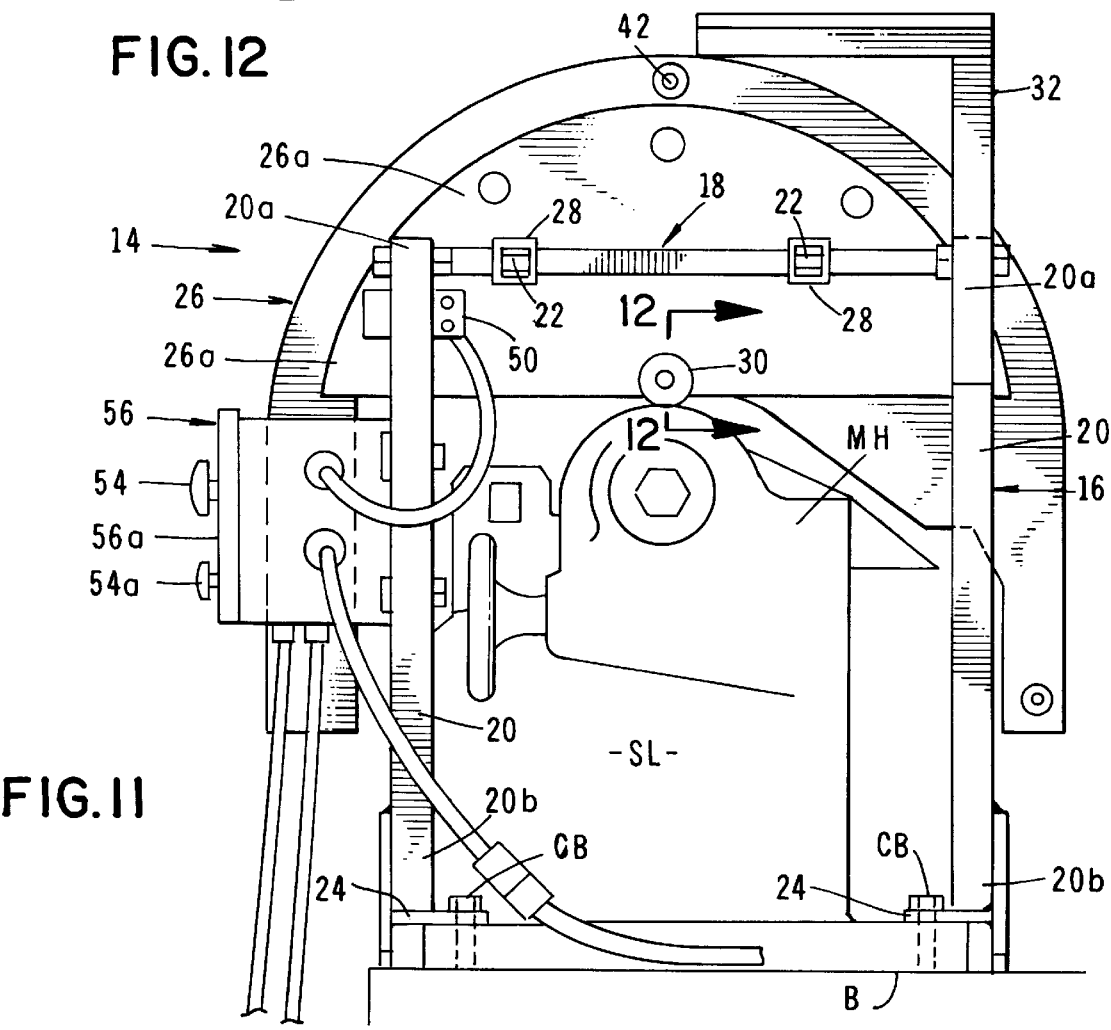
FIG.11

SAFETY GUARD FOR LATHES

BACKGROUND OF THE INVENTION

1. Field of the Invention

The present invention relates generally to safety guards for machine tools. More particularly, the invention concerns a safety guard to prevent an operator from coming into contact with the moving parts of automobile brake and rotor turning specialty lathes of the character used in the automotive trades to dress the surfaces of brake drums and rotors.

2. Discission of the Prior Art

A lathe is a widely used machine tool for revolving a piece of material so as to enable a cutting tool to shape it into a component of circular cross-section. Rotational movement is imparted to the work piece by a work spindle which is typically mounted in the headstock of the lathe. The spindle is rotated at a controlled rate of speed by motor means such as an electrically operated motor.

As a general rule, during operation of a conventional engine lathe to machine a work piece, the operator is exposed to the rotating work piece and to the rotating gripping devices which hold the work piece. This undesirable condition can expose the operator to the risk of substantial injury if the operator or parts of the operator's clothing inadvertently comes into contact with the rotating components.

While engine lathes are typically found in machine shops and are routinely operated by skilled, well-trained machinists, certain types of specialty lathes are found in a non-machine shop environment. Exemplary of such specialty lathes are those used in the automotive trades to dress the surfaces of automotive brake drums and rotors. These specially designed lathes are often located in garages, muffler shops, service stations and the like, and are sometimes operated by mechanics who are often less skilled and less well trained than journeyman machinists. These so called brake lathes, like conventional engine lathes, include a rotating spindle upon which the work piece is mounted so that it can be controllably rotated relative to one or more cutting tools. More particularly, the work pieces which are mounted on the spindle consist either of automobile brake drums or automobile brake rotors and the cutting tools of the machine functions to dress the surfaces of the drum or rotor which are engaged by the brake shoes or the brake pads. A well known manufacturer of disc/rotor and combination drum/disc brake lathes with which the apparatus of the present invention can be used, is Hennessy Industries, Inc. of La Vergne, Tenn.

The conventional automobile brake drum which typically cooperates with hydraulically actuated, internally expanding brake shoes, is generally of a configuration that can present a substantial hazard to the machine operator during the dressing operation wherein the drum is being rotated at relatively high speed. The automobile rotor, when rapidly rotated on the spindle of the specially designed turning lathe, can similarly present a hazard to the unprotected and sometimes relatively unskilled machine operator.

While some attempts have been made in the past to provide guards for brake lathes, none meet Federal Safety Standards set out in 29 C.F.R. 1910.212 or the California standards set out in Title 8 of the California Code of Regulations (CCR) Section 4002(a).

The thrust of the present invention is to provide a novel, easy-to-use safety guard which meets both the aforementioned Federal and California safety standards and can readily be interconnected with specialty lathes of the character used to dress the brake engaging surfaces of automobile brake drums and rotors. When in position on the machine, the safety guard of the invention safely encloses the rotating brake drum or rotor and protects the machine operator from accidentally contacting the work piece during the surface dressing operation.

SUMMARY OF THE INVENTION

It is an object of the present invention to provide a safety apparatus for use in connection with motor driven machine tools, such as engine lathes. More particularly, it is an object of the invention to provide a safety apparatus which is uniquely designed to be used with specialty lathes of the character which functions to dress the brake shoe and brake pad engaging surfaces of automobile brake drums and rotors.

Another object of the invention is to provide a safety apparatus of the aforementioned character which meets applicable Federal and California safety regulations and can be quickly and easily attached to conventional brake drum/disc dressing lathes without the necessity of substantially modifying the lathe.

Another object of the invention is to provide a safety guard as described in the preceding paragraphs which is easy to use, does not interfere with the normal machining processes and yet fully protects the operator from accidentally contacting the rotating work pieces during the dressing operation.

Another object of the invention is to provide a safety apparatus which includes a safety guard for enclosing the rotating spindle of a brake drum dressing lathe and the work piece mounted thereon and further includes novel safety switch means which prevent energization of the motor of the lathe by the factory installed "on-off switch of the machine so long as the safety guard is in a raised position.

Another object of the invention is to provide a safety apparatus as described in the preceding paragraph in which set-up operations can be accomplished when the safety guard is raised only through use of a specially interconnected foot switch which permits controlled, intermittent energization the lathe motor by the operator.

Another object of the invention is to provide a safety apparatus as described herein in which the work can be observed by the operator during the dressing operation, but one in which the motor of the lathe is automatically de-energized by a strategically positioned interlock switch if the safety guard of the apparatus is raised.

Another object of the invention is to provide a safety apparatus of the character described in the preceding paragraphs in which both the foot switch and the interlock switch are operated by 24 volt direct current thereby avoiding potentially lethal shocks to the operator during operation of the control means.

Another object of the invention is to provide a safety apparatus of the class described which is of simple design and one which can be manufactured, installed and maintained relatively inexpensively.

BRIEF DESCRIPTION OF THE DRAWINGS

FIG. 1 is a generally perspective view of one form of the safety guard apparatus of the invention which is usable with conventional brake drum dressing lathes.

FIG. 2 is a fragmentary, generally perspective view demonstrating the manner of attachment of the guard portion of the apparatus to the supporting frame of the specialty lathe.

FIG. 6 is a cross-sectional view taken along lines 6—6 of FIG. 5.

FIG. 7 is a greatly enlarged, cross-sectional view taken along lines 7—7 of FIG. 6.

FIG. 8 is a greatly enlarged, cross-sectional view taken along lines 8—8 of FIG. 6.

FIG. 9 is a fragmentary, side-elevational view similar to FIG. 4, but showing the components of the supporting frame of the apparatus in the lowered, switch engaging position.

FIG. 10 is a cross-sectional view taken along lines 10—10 of FIG. 9.

FIG. 11 is a view taken along lines 11—11 of FIG. 5.

FIG. 12 is a greatly enlarged cross-sectional view taken along lines 12—12 of FIG. 11.

DESCRIPTION OF THE INVENTION

Figure 3:
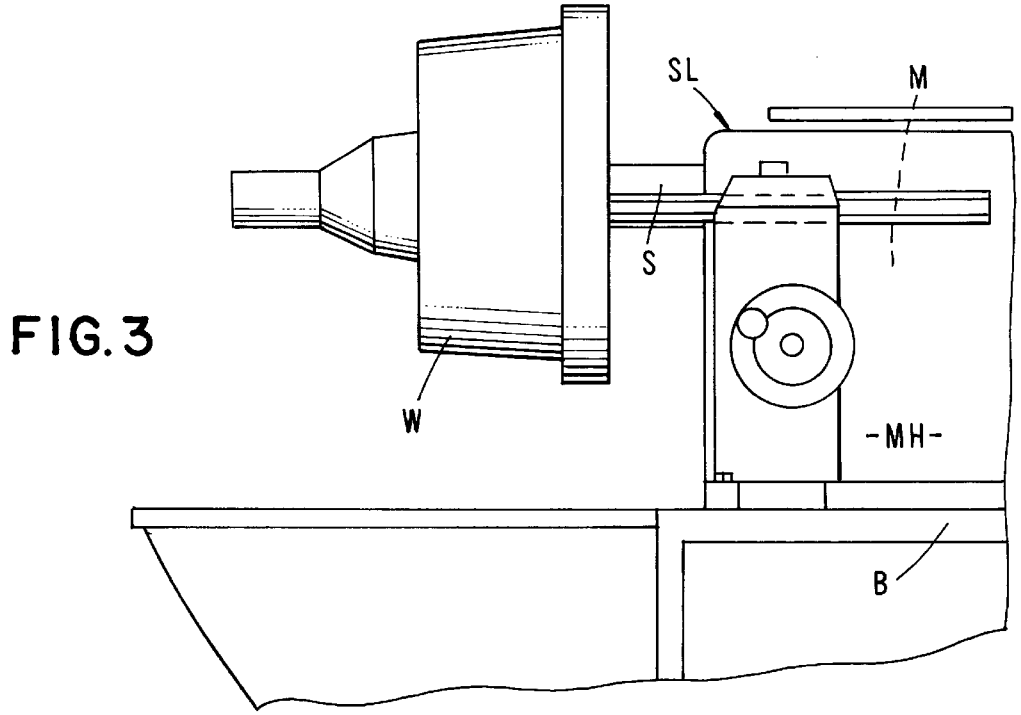
FIGS. 3 and 3A, when considered together, comprise a side-elevational view of the safety guard apparatus of the invention as it appears when interconnected with a specialty lathe such as a brake drum lathe, the safety guard being disposed in an upraised position.
Figure 3A:
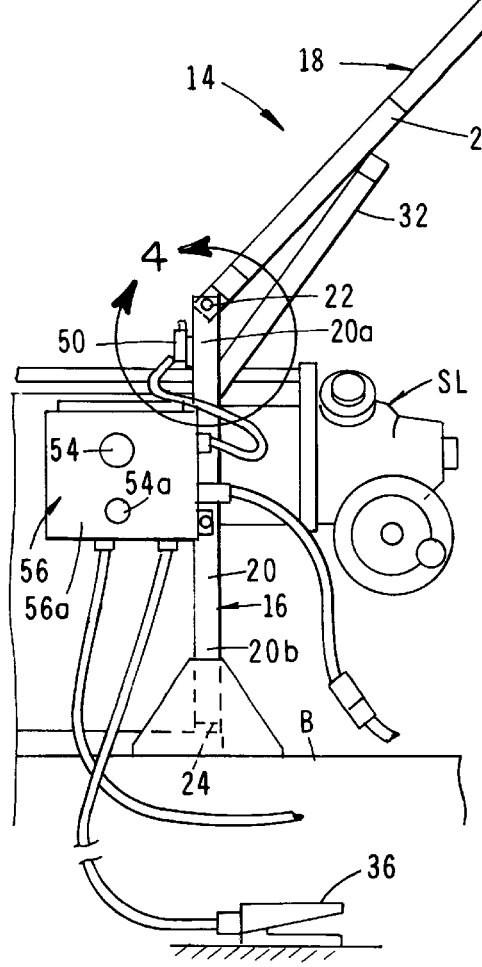

Referring to the drawings and particularly to FIGS. 1, 3, and 3A, one form of the safety apparatus of the present invention is there illustrated and generally identified by the numeral 14. Apparatus 14 is designed for use with specialty lathes of the character used in dressing the brake shoe engaging surface of work pieces such as automobile brake drums. These specialty brake drum dressing lathes, which are identified in the drawings by the letters "SL" are readily commercially available from sources such as Hennessy Industries, Inc. and generally comprise a base "B", a spindle "S" for rotating the work piece "W" and a motor "M" for rotating the spindle. The motor "M" is typically housed within a motor housing "MH" which may be bolted to base B.

Turning particularly to FIG. 1, one form of the safety apparatus of the present invention is there illustrated. This apparatus, which meets all applicable safety standards as set forth in 29 C.F.R. 1910.212 as well as all applicable Canadian and California safety standards, comprises a connector frame 16 and a safety guard assembly 18. Connector frame 16 includes a pair of spaced apart connector legs 20 each of which has an upper extremity 20a and a lower extremity 20b. An axle member 22 spans and is connected to legs 20 proximate their upper extremities 20a.

Figure 5:
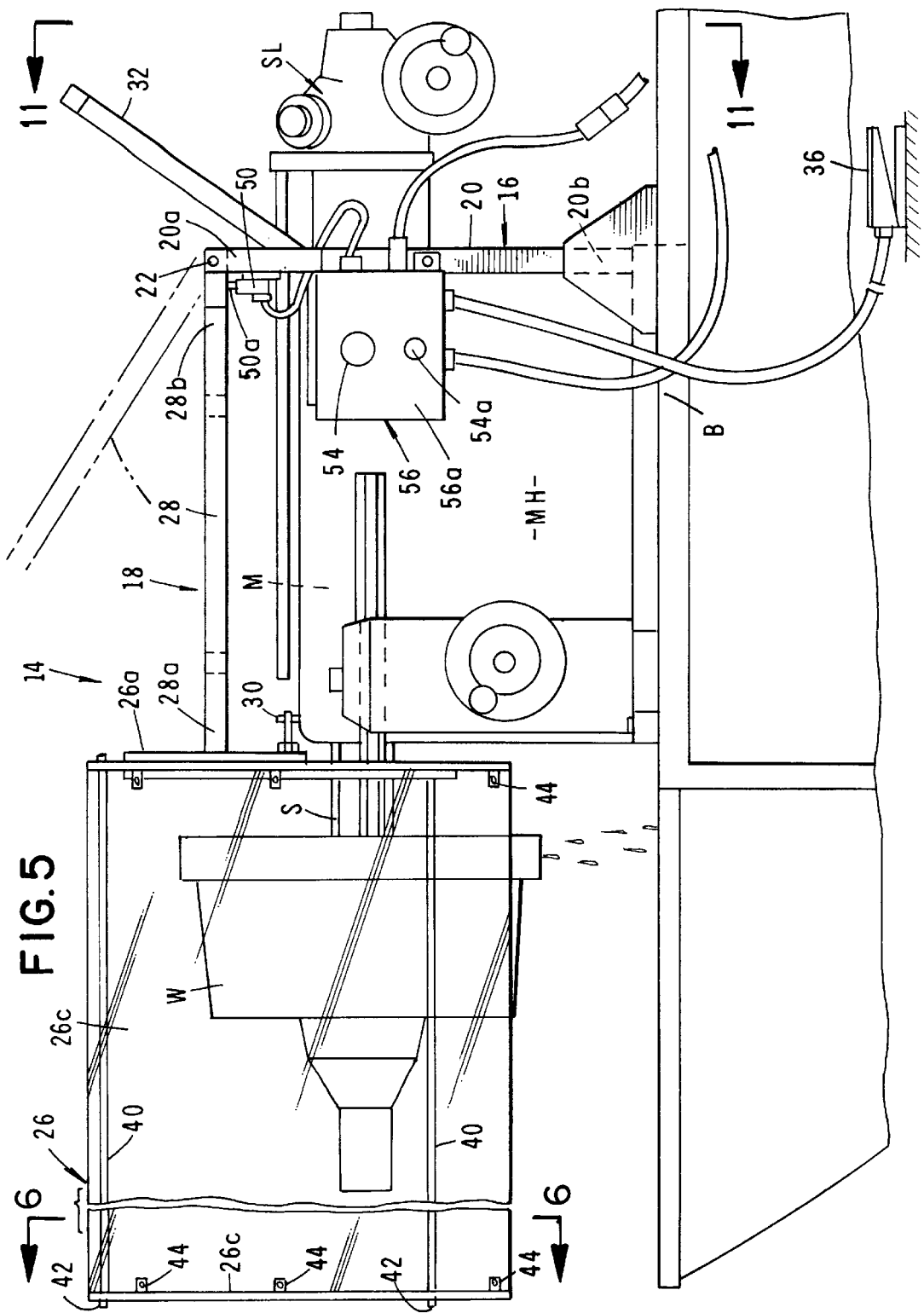
FIG. 5 is a side-elevational view similar to FIGS. 3 and 3A but showing the safety guard apparatus of the invention in its lowered position over the rotating work piece which is interconnected with the spindle of the brake drum lathe.

As best seen in FIGS. 1 and 5, connector frame 16 is interconnected with the base "B" of specialty lathe "SL" by connector means which here comprise apertured connector tabs 24 which are provided at the lower extremities 20b of legs 20. These apertured connector tabs receive a threaded connector such as connector bolts "CB" which are used to interconnect the motor housing of the specialty lathe with the base "B" in the manner shown in FIG. 5. As indicated in FIG. 1, connector tabs 24 are strategically spaced so as to index with the apertures "A" provided in motor housing "MH" which accepts connector bolts "CB". With this construction, the apparatus of the invention can be easily interconnected with the base of the specialty lathe without requiring modification thereto.

Guard assembly 18, which is pivotally connected to frame 16, comprises a generally U-shaped protective cover assembly 26 (FIGS. 1 and 6) and an extension frame 28 which extends rearwardly of cover assembly 26. One end, 28a of extension frame 28, is interconnected with the end plate 26a of cover 26, while the opposite end 28b thereof is pivotally interconnected with axle 22 of connector frame 16. With this construction, the guard assembly of the apparatus can be pivotally moved from the lowered or first work piece enclosing position shown in FIG. 5, into the raised position shown in FIG. 3A. As best seen in FIGS. 2 and 5, mounted on end plate 26a is a first stop means, shown here as a stop member 30, which engages the motor housing "MH" of the specialty lathe when the safety apparatus is in the lowered position shown in FIG. 5. The stop means is strategically positioned on the cover assembly so that when the guard assembly is lowered, the transparent plastic panel 26b of the cover assembly substantially encapsulates the rotating work piece "W" (FIG. 5).

As indicated in FIGS. 3A and 5, a second stop means, shown here as a rearwardly and upwardly extending stop arm 32, which forms a part of connector frame 16, functions to engage extension frame 28 when the guard assembly 18 is in its upraised position shown in FIG. 3A. When the guard assembly 18 is supported in the upraised position shown in FIG. 3A by stop arm 32, the specialty lathe operator has free access to the work piece and to the spindle of the specialty lathe. In a manner presently to be described, when the guard assembly is in the upraised position, the operator can use a novel foot operated switch means 36 to accomplish set-up operations preliminary to dressing the surfaces of the brake shoe. However, when the guard assembly of the invention is in this upraised position, the factory installed start/stop switch of the specialty lathe is disabled and rotation of the spindle can be accomplished only through use of the foot switch.

Turning to FIGS. 1 and 7, it is to be noted that the substantially transparent cover portion 26b of protective cover assembly 26, is clamped between end plates 26a and 26c of the cover assembly by means of a plurality of circumferentially spaced rods 40 which span end plates 28a and 26a in the manner shown in the drawings. As indicated in FIG. 7, tie rods 40 are threaded at each end to accept tightening nuts 42 which, when snugged down against end plates 26a and 26c. securely clamp substantially transparent cover portion 26b in position between the end walls or end plates 26a and 26c. As shown in FIGS. 1 and 8, substantially transparent cover portion 26b is further supported within cover assembly 26 by means of a plurality of connector clips 44, each of which has first and second legs 44a and 44b. Legs 44b are interconnected with substantially transparent cover 26b by fasteners 46 while legs 44a are interconnected with the end walls 26a and 26c of the protective cover by fasteners 48.

Turning once again to FIGS. 1 and 3A, an important feature of the apparatus of the invention comprises a first switch means which is operably associated with motor "M" and with guard assembly 18 for de-energizing the motor whenever the cover is moved toward the second raised position shown in FIG. 3A. This important first switch means is here provided in the form of a normally open interlock switch 50 which, as best seen in FIG. 9, includes a plunger 50a which is engagable by the extension frame 28 when the extension frame moves into the lowered position shown in FIGS. 5 and 9. When plunger 50a is in its inward position, shown in FIGS. 5 and 9, the switch is closed so that motor "M" of the specialty lathe can be energized by operating an operably interconnected second switch means here provided as start/stop switches 54 and 54a. These switches are conveniently mounted within a control box 56 having a cover 56a. Control box 56 is, in turn, mounted on connector frame 20 in the manner best seen in FIG. 1. The manner of interconnection of interlock switch 50, switch 54 and the previously identified foot switch 36, which comprises the third switch means of the invention, is shown in FIG. 14 of the drawings.

Figure 13:
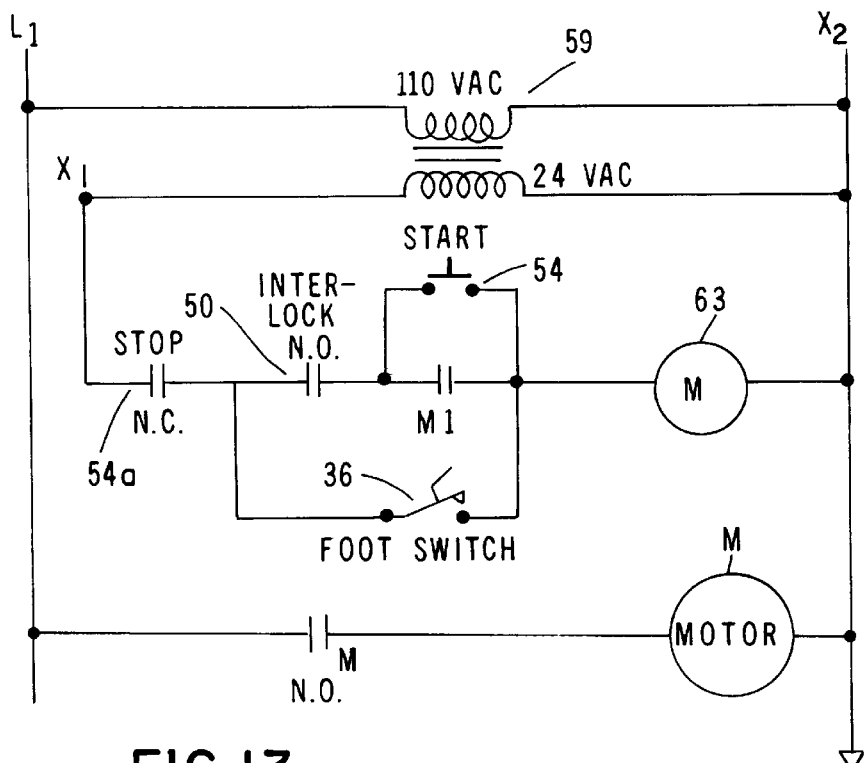
FIG. 13 is a generally diagrammatic view of one form of the circuit of the safety apparatus of the invention for de-energizing the motor of the brake drum lathe when the safety guard is moved into the upraised position shown in FIG. 3A.
Figure 4:
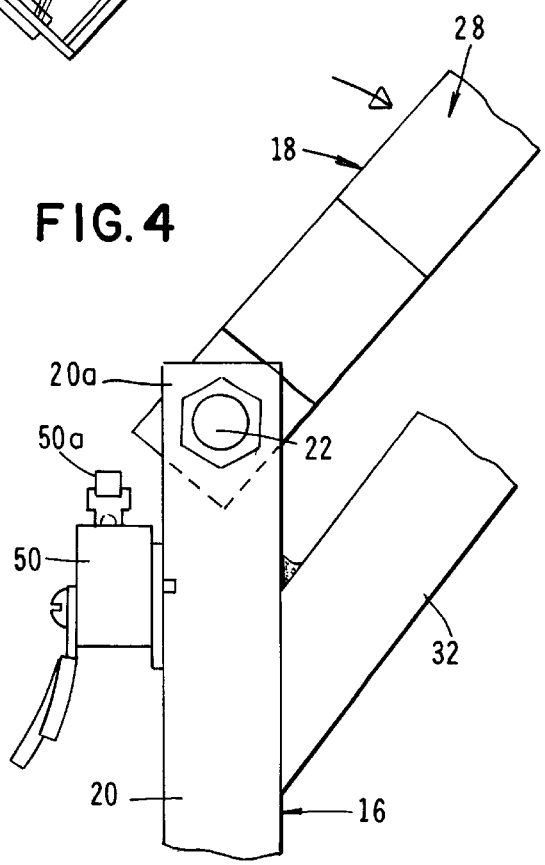
FIG. 4 is a greatly enlarged, fragmentary view of the portion of the apparatus identified in FIG. 3A by the numeral 4.

It is to be appreciated that, when the guard assembly of the apparatus is moved toward the upraised position shown in FIGS. 3A and 4 so that extension frame 28 moves away from switch 50, the plunger 50a of the switch automatically returns to the switch open position thereby automatically de-energizing motor "M". When switch 50 is in its normally open position, the motor of the specialty lathe can be energized only through operation of the third switch means or safety foot switch 36. Accordingly, during set up, when the guard assembly is of necessity raised so that the work piece "W" can be mounted on spindle "S", any rotational movement of the spindle that is required by the operator during set up must be accomplished through operation of the safety foot switch 36. It is only when the apparatus is moved into the work piece encapsulating position, shown in FIG. 5, and switch 50 is closed in the manner shown in FIG. 9, that the motor of the apparatus can be energized using the start/stop switch 54 mounted on control box 56. Each of the switches 36, 50 and 54 as well as the other electrical components shown in FIG. 13 are of conventional construction and are readily commercially available from a number of commercial sources as, for example, Continental Industries of Ontario, Calif. The operation and interconnection of these switches in the manner shown in FIG. 13 is well understood by those skilled in the art. As indicated in FIG. 13, switches 36 and 50 are 24 volt DC and, therefore, pose no electrical hazard. In this regard, a transformer 59, which is housed within control box 56, reduces the normal 110 volt AC power to 24 volts DC for the control circuit. Transformer 59 is of a character manufactured by Honeywell Company and is readily commercially available from sources such as Continental Industries. The contactor 63 (FIG. 13) functions to prohibit the re-energizing of the circuit by lowering the extension frame 28 and closing interlock switch 50 until the start switch 54a (FIG. 14) is manually actuated. Contactor 63 is of a character manufactured by Furnas Company of Ohio and can also be obtained from Continental Industries.

Figure 14:
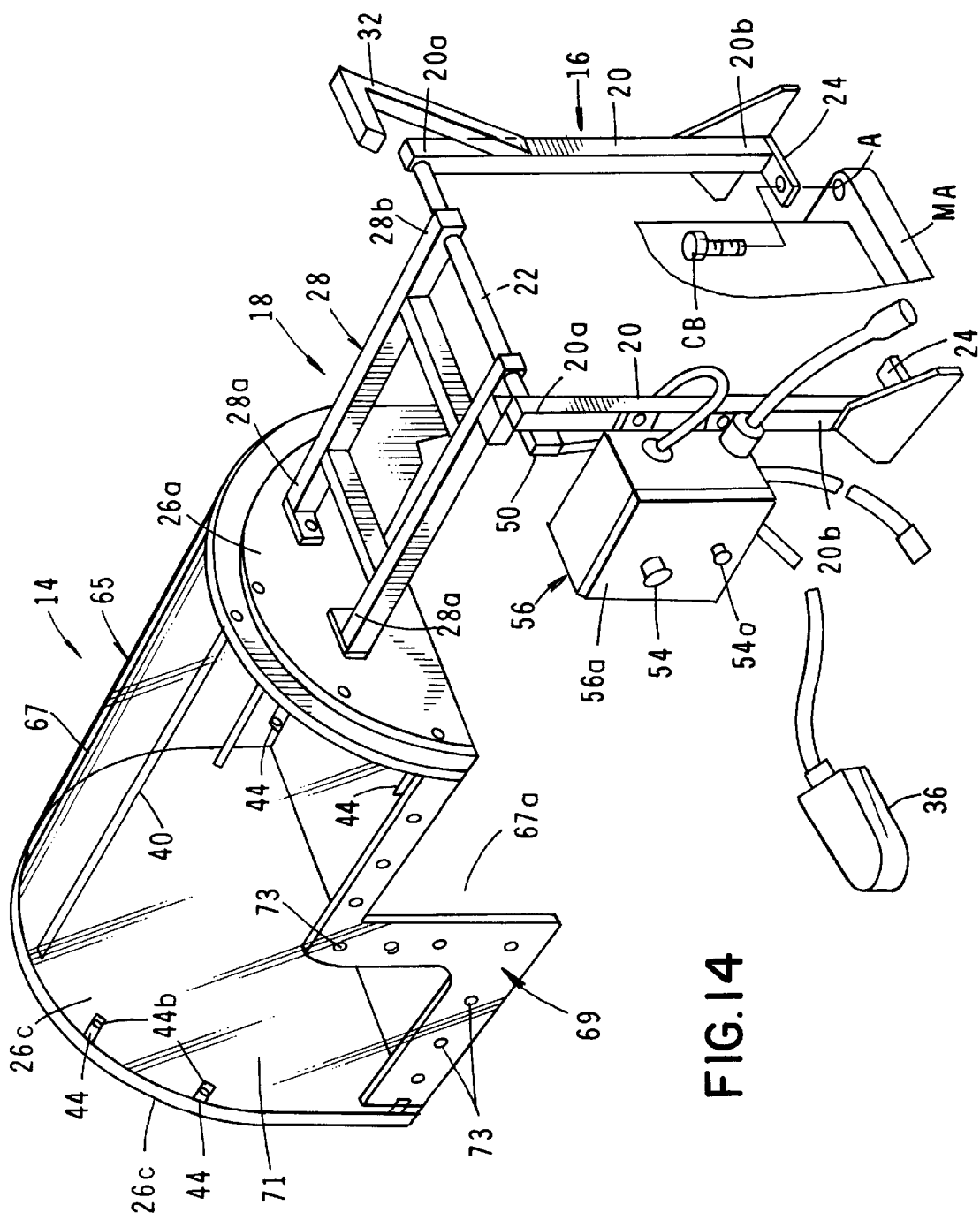
FIG. 14 is a generally perspective view of an alternate form of safety guard apparatus of the present invention which is usable with conventional rotor dressing specialty lathes.

Turning next to FIG. 14, an alternate form of the apparatus of the invention is there shown. This second form of the invention is used in conjunction with specialty lathes adapted to dress the brake engaging surfaces of automobile rotors wherein the cutting tools move along different paths than those used to dress brake drums. The apparatus shown in FIG. 14 is similar in most respects to that shown in FIGS. 1 through 13 and like members are used in FIG. 14 to identify like components.

The major difference between the apparatus of FIG. 14 and the earlier described apparatus used with brake drum dressing machines, resides in the differently designed guard assembly 65. More particularly, the cover assembly 67 of the guard assembly, which is connected to an extension frame 28, that is of the same construction as previously described, is provided with a side opening 67a that permits travel of the cutting tools of the lathe during the rotor surface dressing operation. While as shown in FIG. 14, the overall design of the cover assembly 67 is similar to that of cover assembly 26, the operator side cover 67 includes a generally "Z" shaped structural support 69 to which a modified transparent plastic cover panel 71 is connected by suitable connectors 73. With the construction shown the safety cover will not interfere with the transversely moving rotor cutting tools of the rotor dressing specialty lathe during the rotor dressing operation.

In using both forms of the apparatus of the invention, the guard assembly is first raised to the position shown in FIG. 3A so that the work piece "W" can be appropriately mounted on the spindle "S". With the guard assembly raised, micro switch 50 is opened so that the motor of the specialty lathe can be energized only by using foot switch 36 (see FIGS. 3A and 13). After the work piece is appropriately affixed to the spindles and the machine is properly set up to accomplish the cutting step, the guard assembly is lowered into the position shown in FIG. 15 wherein the work piece and the rotating spindle are safely enclosed. Energization and de-energization of motor "M" can then be accomplished using switches 54 and 54a which are physically housed within control box 56 (see also FIG. 13). During the actual surface dressing operation, the cutting heads traverse through the required distance for the cut and then stop. The safety cover can then be safely raised so that the work piece can be removed from the spindle.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A safety apparatus, said safety apparatus being usable with a specialty lathe for dressing surfaces of work pieces including automobile brake drums and rotors, the specialty lathe having a base, a spindle for rotating the work piece, and an electrically operated motor for rotating the spindle, said safety apparatus comprising:

(a) a connector frame;

(b) a connector means for connecting said connector frame to the base;

(c) a guard assembly pivotally connected to said connector frame comprising a substantially transparent cover movable from a first position covering the spindle and work piece to a second raised position;

(d) first switch means operably associated with the motor of the specialty lathe and with said guard assembly for deenergizing the motor when said cover is moved toward said second raised position; and (e) second switch means for energizing the motor of the specialty lathe when said cover is in said second raised position.

2. An apparatus as defined in claim 1 in which said cover of said guard assembly is generally "U" shaped in cross-section and includes spaced apart first and second end walls and a substantially transparent plastic panel connected to and spanning said first and second end walls.

3. An apparatus as defined in claim 2 in which said guard assembly further comprises an extension frame disposed intermediate said connector frame and said first end wall of said cover.

4. A safety apparatus, said safety apparatus being usable with a specialty lathe for dressing surfaces of work pieces including automobile brake drums and rotors, the specialty lathe having a base, a spindle for rotatably carrying the work piece and an electrically operated motor for rotating the spindle, said safety apparatus comprising:

(a) a connector frame, including:
  (i) spaced apart legs each having an upper extremity and lower extremity; and
  (ii) an axle member connected to and spanning said spaced apart legs;

(b) connector means for connecting said lower extremity of each said leg to the base of the specialty lathe at a location spaced apart from the spindle;

(c) a guard assembly pivotally connected to said axle member of said connector frame, said guard assembly comprising:
  (i) a protective cover receivable over the spindle of the specialty lathe and the work piece connected thereto; and
  (ii) an extension frame having a first end portion connected to said protective cover and a second end portion pivotally connected to said axle member of said connector frame for movement of said protective cover from a first lowered position covering the spindle and work piece to a second raised position exposing the spindle and work piece;

(d) first switch means operably connected to the motor of the specialty lathe and to said guard assembly for de-energizing the motor upon movement of said protective cover toward said second raised position; and (e) second switch means for energizing the motor of the specialty lathe when said protective cover is in said second raised position.

5. An apparatus as defined in claim 4 in which said first switch means comprises an interlock switch mounted on said connector frame, said interlock switch being operated by movement of said extension frame.

6. An apparatus as defined in claim 4 in which said second switch means comprises a foot operated switch.

* * * * *